3,449,652
STARTING CIRCUIT FOR A SYNCHRONOUS MOTOR
Akira Ishizaki, Tokyo, Japan, assignor to Meidensha Electric Mfg. Co., Ltd., Tokyo, Japan
Filed Sept. 19, 1966, Ser. No. 580,462
Claims priority, application Japan, Sept. 17, 1965, 40/56,967
Int. Cl. H02p 1/50
U.S. Cl. 318—181  4 Claims

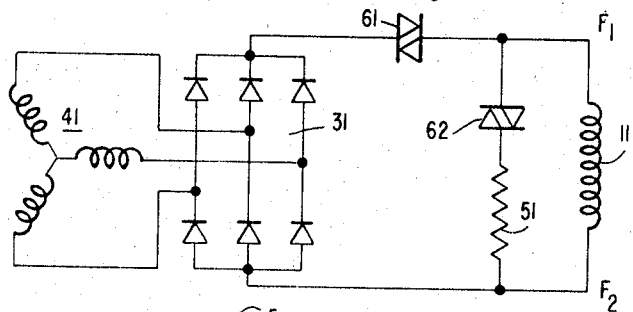
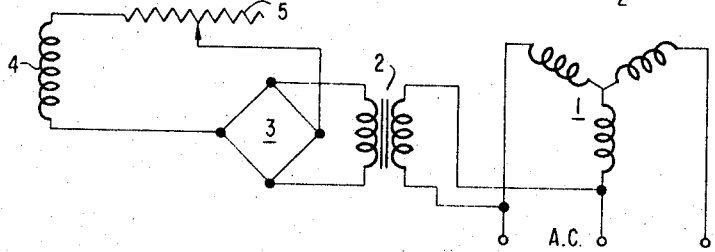
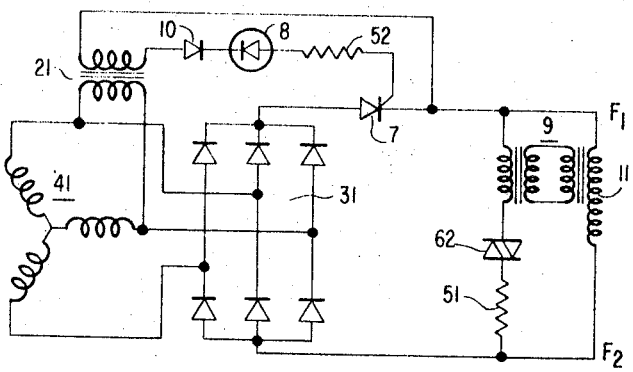
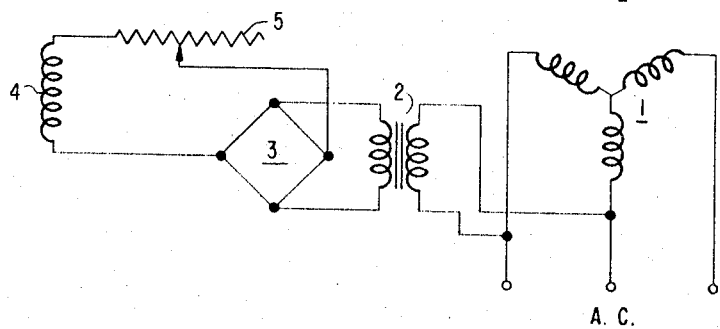
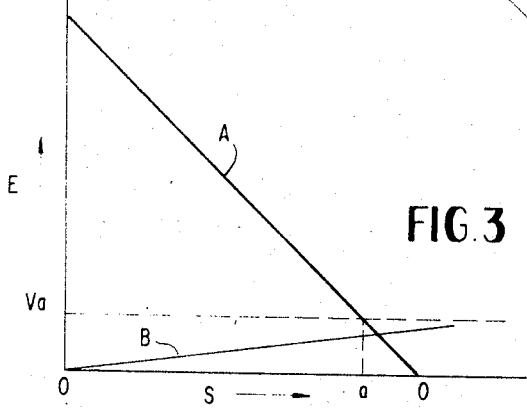
FIG.1
FIG.2
FIG.3
INVENTOR
AKIRA ISHIZAKI
BY Sughrue, Rothwell, Mion, Zinn &
    Macpeak
    ATTORNEYS United States Patent Office 3,449,652
Patented June 10, 1969

ABSTRACT OF THE DISCLOSURE

An automatic starting circuit for an A.C. synchronous motor. A thyristor is connected in parallel with a field winding and another thyristor is connected in series with the winding, allowing shunting and disconnection of the winding to restore synchronism.

This invention relates to an automatic starting circuit for an AC synchronous motor.

In the prior art, starting and accelerating torques for synchronous motors are generated by amortisseur windings provided with rotor field pole heads. In order to prevent high voltages from being induced in the field windings of the synchronous motor, and to improve its torque characteristics, the field winding is shunted by a relay-switched, low resistance path during the starting operation. When synchronous speed is approached, the shunt path is removed and DC exciting current is relay-switched into the field winding to pull the motor into synchronism. This type of circuit not only involves complex switching circuitry for the relays, but suffers from the added disadvantage that the relay switches frequently malfunction, necessitating costly and time-consuming maintenance procedures.

It is therefore a primary object of this invention to provide a novel starting circuit for a synchronous motor which overcomes the above-noted disadvantages of the prior art circuits.

It is a further object of this invention to provide a starting circuit which operates to automatically accelerate a synchronous motor and pull it into synchronism merely by energizing the armature winding of the motor from a suitable AC source, and which does not involve any complex relay switching circuitry. This starting circuit also operates to automatically restore the motor to synchronism, whenever it is pulled out of step for some reason, by shunting the field winding and interrupting the DC exciting current.

The foregoing and other objects, features and advantages of the invention will be apparent from the following more particular description of preferred embodiments of the invention, as illustrated in the accompanying drawings, in which:

FIGURE 1 shows a circuit diagram of a preferred embodiment of the invention,

FIGURE 2 shows a circuit diagram of an alternate embodiment of the invention, and FIGURE 3 shows a plot of the voltage versus slip characteristics for these starting circuits.

Referring now to FIGURE 1, an armature winding 1 of a synchronous motor is connected across a three-phase AC source. A transformer 2, whose primary winding is connected across two of the phases of the armature winding 1, has its secondary winding connected to the input terminals of a full wave rectifier 3. The output diagonals of the rectifier are connected in series with a field winding 4 and rheostat 5 of an AC exciter associated with the synchronous motor. The armature winding 1, transformer 2, rectifier 3, field winding 4, and rheostat 5 all constitute the stator system of the synchronous motor. An armature winding 41 for the AC exciter cooperates with the field winding 4, and its output is converted to DC by a rectifier bank 31. The output of the latter is applied across a field winding 11 of the synchronous motor through a bi-directional diode thyristor switch 61, and the field winding 11 is shunted by a similar thyristor switch 62 connected in series with a resistor 51. The field winding 11, armature winding 41, rectifier bank 31, thyristor switches 61 and 62 and resistor 51 all constitute the rotor system of the synchronous motor and are mounted on the motor shaft. The thyristor switch 61 is chosen to have a slightly higher breakdown voltage than that of thyristor switch 62.

FIGURE 3 shows a plot of the field winding voltage E versus the rotor slip S for the synchronous motor. Curve A represents the voltage induced across field winding terminals F1 and F2, in FIGURE 1, and curve B shows the DC signal available at the output of the rectifier bank 31 of the AC exciter.

Turning now to the operation of the FIGURE 1 embodiment, when the armature winding 1 is connected to a three-phase AC source as shown, an amortisseur or damper winding provided at the head of the rotor field pole of the synchronous motor, and serving as the secondary winding of an induction motor, generates starting torque to accelerate the rotor. At the same time, the field winding 4 of the AC exciter generator is energized through the transformer 2 and rectifier bridge 3 under the control of rheostat 5. As the rotor shaft of the synchronous motor begins to turn an AC signal is therefore induced in the armature winding 41 of the exciter and is applied to the rectifier bank 31. Since the slip is initially large a high voltage is induced in the field winding 11 as shown by curve A in FIGURE 3. This initially high voltage decreases as the rotational speed of the motor increases and the slip of the motor decreases. The breakdown voltage $V_a$ of the thyristor switch 62 is selected to be equal to the voltage induced in the field winding 11 at a suitable slip value $a$, as shown in FIGURE 3. Until this slip value $a$ is reached, the voltage induced in the field winding 11 of the synchronous motor is greater than the breakdown voltage $V_a$ of the thyristor switch 62, and the latter is therefore rendered conductive. With the thyristor switch 62 conductive the field winding 11 is shunted by the resistor 51, thereby preventing the induction of damagingly high voltages in the field winding 11. As the motor speed continues to increase and the slip decreases to a value smaller than $a$ the signal induced in field winding 11 falls below the threshold or breakdown potential of thyristor switch 62, and the latter therefore becomes nonconductive. At the same time, the rectified exciter voltage, which has been increasing with the motor speed as shown by curve B, is applied to one side of thyristor switch 61. When this signal, added to the negative voltage induced in field winding 11 when terminal F2 is positive, exceeds the breakdown potential of thyristor switch 61, the switch becomes conductive. This couples the DC output of the exciter generator to the field winding 11 which pulls the motor into final synchronism at a slip value of zero. In the synchronous running state of the motor when the slip is zero, the DC output of the exciter generator flows entirely through the field winding 11, since the magnitude of the DC output is chosen to be slightly below the breakdown potential of the thyristor switch 62, thereby preventing switch 62 from breaking down and shunting field winding 11 during normal operation.

If the synchronous motor is pulled out of step for some reason and the slip increases beyond the value $a$, then the voltage induced in field winding 11 once again becomes larger than the breakdown potential of thyristor switch 62, while the DC output of the exciter generator becomes smaller. This causes the thyristor switch 62 to become conductive and shunt the field winding 11, and during a particular half cycle when terminal F1 is positive, the thyristor switch 61 is again rendered nonconduutive to interrupt the DC exciting signal. The motor is then accelerated again in the same manner as during the starting operation until the slip decreases below the value a, at which time the shunt path is automatically removed and the exciter output is coupled to the motor field winding as described above.

In the alternate embodiment of FIGURE 2, in which the same reference numerals have been used to designate structure also present in FIGURE 1, the thyristor switch 61 has been replaced by a silicon controlled rectifier 7 poled as shown. The primary winding of a transformer 21 is tapped across two of the exciter armature phases, and its secondary is connected across the gate-cathode terminals of the SCR in series with a diode 10, a Zener diode 8 and a resistor 52. A pulse transformer 9 has also been included to positively trigger the thyristor switch 62, with its primary winding coupled to the motor field wind- and 11 and its secondary winding in series with switch 62.

The operation of the FIGURE 2 embodiment follows closely that of FIGURE 1. After the armature winding 1 is connected to a three-phase AC source and the motor accelerates toward its synchronous speed, the signal induced in the exciter armature winding 41 increases as does the voltage across the secondary coil of transformer 21. By properly choosing the parameters of the circuit components, the Zener diode 8 will break down when the slip approaches the value A, which will in turn gate on the SCR 7 and couple the DC exciter signal across the motor field winding 11. Shortly before this occurs, the signal induced in the field winding 11 will have dropped below the conduction threshold of thyristor switch 62 to extinguish the latter and remove the resistive shunt path as described earlier.

By firing the SCR with a signal derived from the AC side of the exciter generator, the SCR functions independently of the breakdown potential of thyristor switch 62 and the signal induced in the field winding 11. This permits greater latitude in the design and selection of these components and also reduces the criticality of the value of resistor 51. The purpose of the pulse transformer 9 is merely to insure the positive triggering of thyristor switch 62 at the proper times.

It will be appreciated by those skilled in the art to which this invention pertains that many minor changes and variations are possible without departing from the spirit and scope of the invention. For example a DC exciter generator could be employed instead of the AC generator disclosed with equal facility, or exciting power could be brought in from a completely external source.

What is claimed is:
1. A starting circuit for a synchronous motor having an armature winding energizable from an AC source and a field winding whose induced voltage varies inversely as a function of motor speed, comprising:
    (a) a source of DC excitation power whose voltage varies directly as a function of motor speed,
    (b) a first bidirectional diode thyristor switch connected in parallel with the field winding to serve as a threshold conduction device breaking down at a first predetermined voltage, thereby shunting the field winding when the slip of the motor is above a predetermined slip value,
    (c) a second bidirectional diode thyristor switch connected in series between the excitation source and the field winding to serve as a threshold conduction device breaking down at a second predetermined voltage, thereby connecting the excitation source to the field winding when the slip of the motor is below the predetermined slip value,
        the second predetermined voltage being slightly greater than the first predetermined voltage, the maximum voltage from the DC source being less than the first predetermined voltage,
        whereby the field winding is shunted by the first switch and disconnected from the excitation source by the second switch during starting and acceleration until the predetermined slip is reached, at which time the shunt is removed and the excitation source is connected.
2. A starting circuit for a synchronous motor as defined in claim 1 wherein the source of DC excitation power comprises:
    (a) an AC generator driven by the synchronous motor, and
    (b) a full wave rectifier bank connected to the output of the generator.
3. A starting circuit for a synchronous motor having an armature winding energizable from an AC source and a field winding whose induced volage varies inversely as a function of motor speed, comprising:
    (a) a three-phase AC generator driven by the synchronous motor,
    (b) a full wave rectifier bank connected to the output of the generator and being an excitation source for providing DC excitation power,
    (c) a bidirectional threshold conduction device connected in parallel with the field winding and controlled by the voltage induced in the field winding to shunt the field winding when the slip of the motor is above a predetermined slip value,
    (d) a gated rectifier connected in series between the excitation source and the field winding, and having gate, anode and cathode terminals,
    (e) means responsive to the voltage of the excitation source for gating the rectifier ON when the slip of the motor falls below the predetermined value, comprising a transformer having a primary winding connected across two of the AC generator phases and having a secondary winding connected in series with a Zener diode across the gate and cathode terminals of the gated rectifier,
        whereby the field winding is shunted by the threshold conduction device and disconnected from the excitation source by the gated rectifier during starting and acceleration until the predetermined slip is reached, at which time the shunt is removed and the excitation source is connected.
4. A starting circuit for a synchronous motor as defined in claim 3 wherein the threshold conduction device is a thyristor switch and the gated rectifier is a silicon controlled rectifier.

References Cited

UNITED STATES PATENTS

| | | | |
|---|---|---|---|
| 3,098,959 | 7/1963 | Rosenberry | 318—181 |
| 3,100,279 | 8/1963 | Rohner | 318—167 |
| 3,350,613 | 10/1967 | Brockman et al. | 318—176 |
| 3,354,368 | 11/1967 | Williamson | 318—176 |

ORIS L. RADER, *Primary Examiner.*

G. Z. RUBINSON, *Assistant Examiner.*

U.S. Cl. X.R.

318—183, 193